United States Patent
Ruehl et al.

(10) Patent No.: US 11,084,073 B2
(45) Date of Patent: Aug. 10, 2021

(54) TREATMENT OF POLLUTED AQUEOUS LIQUIDS

(71) Applicant: HOLCIM TECHNOLOGY LTD, Jona (CH)

(72) Inventors: Paul Ruehl, Rochester, MI (US); Brian Borowski, Romeoville, IL (US)

(73) Assignee: HOLCIM TECHNOLOGY LTD, Zug (CH)

( * ) Notice: Subject to any disclaimer, the term of this patent is extended or adjusted under 35 U.S.C. 154(b) by 0 days.

(21) Appl. No.: 16/506,110

(22) Filed: Jul. 9, 2019

(65) Prior Publication Data
US 2021/0009449 A1    Jan. 14, 2021

(51) Int. Cl.
*B09B 1/00* (2006.01)
*C02F 11/00* (2006.01)
C02F 101/36 (2006.01)
C02F 103/06 (2006.01)

(52) U.S. Cl.
CPC ............ *B09B 1/004* (2013.01); *C02F 11/008* (2013.01); *C02F 2101/36* (2013.01); *C02F 2103/06* (2013.01); *C02F 2301/08* (2013.01)

(58) Field of Classification Search
CPC ............................. B09B 1/004; C02F 11/008
See application file for complete search history.

(56) References Cited

U.S. PATENT DOCUMENTS

| | | | | |
|---|---|---|---|---|
| 3,841,102 A | * | 10/1974 | Cinner | C02F 1/281 588/252 |
| 4,230,568 A | | 10/1980 | Chappell | |
| 5,161,915 A | * | 11/1992 | Hansen | B09B 1/004 405/129.9 |
| 5,385,429 A | | 1/1995 | Hansen | |
| 5,997,629 A | * | 12/1999 | Hills | B09C 1/08 106/692 |
| 7,284,930 B2 | | 10/2007 | Shi et al. | |
| 8,236,098 B2 | | 8/2012 | Ramme et al. | |

FOREIGN PATENT DOCUMENTS

GB        1 418 215 A    12/1975
WO    WO 2019/075518 A1    4/2019

OTHER PUBLICATIONS

Lang, et al. National Estimate of Per- and Polyfluoroalkyl Substance (PFAS) Release to U.S. Municipal Landfill Leachate. Environ. Sci. Technol. 2017, 51,2197-2205 2017.*
Kallel, A., et al., "Co-management of landfill leachate concentrate with brick waste by solidification/stabilization treatment," Arab J Geosci (2017) 10:81), 12 pages.
International Search Report as issued in International Patent Application No. PCT/EP2020/069390, dated Oct. 15, 2020.

* cited by examiner

*Primary Examiner* — Janine M Kreck
(74) *Attorney, Agent, or Firm* — Pillsbury Winthrop Shaw Pittman LLP

(57) ABSTRACT

A method of treatment of aqueous liquid contaminated by pollutants, includes (i) mixing the contaminated aqueous liquid with a mineral binder in order to produce an homogeneous slurry, (ii) depositing the slurry, (iii) letting the slurry set and harden, wherein the mineral binder includes Portland cement, and wherein the contaminated aqueous liquid includes organic pollutants.

14 Claims, No Drawings

TREATMENT OF POLLUTED AQUEOUS LIQUIDS

The disclosure relates to the treatment of polluted aqueous liquids. More particularly, the disclosure relates to a method of treatment of aqueous liquid contaminated by organic pollutants.

Polluted liquids need to be decontaminated for obvious environmental reasons. Pollutants can be inorganic but also of organic type, including PFOA (Perfluorooctanoic acid) and PFOS (Perfluorooctanesulfonic acid). These are members of a family of related compounds commonly known as (PFAS) or Per- and Polyfluoroalkyl Substances.

PFAS are very persistent in the environment and in the human body—meaning they don't break down and they can accumulate over time. There is evidence that exposure to PFAS can lead to adverse human health effects.

PFAS substances are a group of man-made chemicals that can be found in food packaged in PFAS-containing materials, processed with equipment that used PFAS, or grown in PFAS-contaminated soil or water or in commercial household products, including stain- and water-repellent fabrics, nonstick products (e.g., Teflon), polishes, waxes, paints, cleaning products, and fire-fighting foams (a major source of groundwater contamination at airports and military bases where firefighting training occurs).

Thus PFAS substances are often present in waste. When these wastes are stored in a landfill, the PFAS substances will frequently be present in the leachate generated in the landfill and collected in a drainage system that is discharged to municipal wastewater treatment plants, recirculated on the landfill, or even transported to a separate waste management facility.

By the method of the disclosure such organic pollutants can be encapsulated in an inorganic matrix formed by mixing the contaminated aqueous liquid with a mineral binder. The inorganic matrix of the disclosure does not develop a high strength and can thus easily be excavated. The excavated material may be particularly useful as daily or interim cover for waste piles, especially waste piles located at the generating landfill.

During the processing or storage of waste, waste may be concentrated into piles within landfills, compost windows, sludge heaps, etc. When waste is concentrated into piles, it is often necessary to cover them to minimize their odor, prevent fires, prevent the movement of the waste, and prevent vectors such as birds, flies, and other insects from feeding thereon. Waste piles can be covered by spreading a layer of hydraulic binder over the exposed portions of the waste piles.

The method of the disclosure significantly reduces the leachability of organic pollutants, including PFAS, in the polluted aqueous liquid and adds value to the product resulting from the method as a waste pile cover, in particular as a daily or interim waste pile cover. The method of the disclosure is particularly advantageous when the polluted aqueous liquid is a leachate from a landfill where the method is put into practice. Then the encapsulation step and the recovery step are performed at the same landfill site, thus further saving transport costs and avoiding handling and transportation of polluted liquid.

U.S. Pat. No. 5,161,915 discloses method of treatment of polluted leachate. The main purpose of the disclosure is to prepare a cover of a landfill. Cellulose is added to the mixture to reduce the erosion of the landfill cover. It is not mentioned that the disclosure is capable of trapping the pollutants that are initially in the leachate. There is no indication that organic pollutants are treated in this document.

U.S. Pat. No. 7,284,930 relates to the preparation of a hard cover for landfills, and is quite similar to U.S. Pat. No. 5,161,915. This patent contains an additional feature to increase the adhesion of the cover on glass and plastic elements by included specific polymers into the composition, which is, according to this invention, the main issue with U.S. Pat. No. 5,161,915. There is no indication that organic pollutants are treated in this document.

In U.S. Pat. No. 8,236,098, polluted leachate is used to prepare a building material, where the leachate is used to replace some or all of the mixing water. The use of leachate is said to increase the concrete properties. A claimed advantage of the disclosure is to reduce the consumption of fresh clean water for the preparation of building materials. There is no specific mention that mixing cement with leachate can effectively encapsulate pollutants. The purpose of this disclosure is to make a building material with a minimum compressive strength of at least 2 MPa.

Co-management of landfill leachate concentrate with brick waste by solidification/stabilization treatment is disclosed in Kallel et al. (Co-management of landfill leachate concentrate with brick waste by solidification/stabilization treatment, Arab J Geaoci (2017) 10:81). This process may use leachate concentrate from landfills but the focus is on making a concrete material from the leachate and recycled brick as well as other traditional concrete materials. They were looking at strengths of at least 25 MPa, which is not suitable for the present disclosure being too high for an interim or daily waste cover.

It is, therefore, an object of the present disclosure to provide a method of treatment of aqueous liquid contaminated by pollutants, comprising the steps of:
  (i) mixing the contaminated aqueous liquid with a mineral binder in order to produce a homogeneous slurry,
  (ii) depositing, especially spraying, the slurry,
  (iii) letting the slurry set and harden, wherein the mineral binder comprises Portland cement, and wherein the contaminated aqueous liquid comprises organic pollutants.

It is also an object of the present disclosure to provide a method of treatment of an aqueous landfill leachate or an aqueous leachate concentrate contaminated by organic pollutants, comprising the steps of:
  (i) mixing the aqueous landfill leachate or the aqueous landfill leachate concentrate with a mineral binder containing Portland cement in order to produce a homogeneous slurry,
  (ii) depositing, advantageously spraying, the slurry on a waste pile to form a daily or interim cover,
  (iii) letting the slurry set and harden for later use as a daily or interim cover on the waste pile.

The disclosure does not aim at making a building material nor making a material having any compressive strength requirement. On the contrary, to be used as daily or interim cover on the waste pile, the material has to be easily excavated.

The term "setting" is to be understood according to the present disclosure as the passage to the solid state by chemical hydration reaction of the binder. The setting is generally followed by a hardening period.

The term "hardening" is to be understood according to the present disclosure as the development of mechanical properties of a hydraulic binder, after the end of the setting.

Mineral Binder:

The mineral binder contains Portland cement.

The mineral binder preferentially also contains a mineral component between 0 wt.-% and 80 wt.-%, more preferentially between 35 wt.-% and 80 wt.-% of mineral binder. The mineral component is preferentially selected from cement kiln dust (CKD), lime dust, ground limestone, ground slag, fly ash, burnt oil shale, or is a mixture thereof. Even more preferentially, the mineral component is cement kiln dust.

The Portland cement of the disclosure is preferably, according to the ASTM classification C150/C150M of 2018, either a Type I cement, a Type II cement, a Type III cement, a Type IV cement, or a Type V Cement. More preferentially, the Portland cement of the disclosure is a Type I, Type II or a Type III cement, preferentially a Type I or Type III cement. The Portland cement can be a mixture of different Portland cements.

An ASTM Type I cement is a general purpose cement for the construction industry. It is characterized by a significant amount of alite phase, and has an average to high strength development. An ASTM Type III cement is formulated in order to develop high early strength. It is typically ground more finely that a Type I cement, and may also have a different mineralogical and chemical composition, such as higher C3A and calcium sulfate contents.

Portland cements classified according to the European Standard NF EN 197-1 of April 2012, a CEM I, a CEM II, a CEM III, a CEM IV or a CEM V, are also suitable for this invention. More preferentially, a CEM I or a CEM II can be used.

Cement kiln dust (CKD) is a by-product of the cement manufacturing process, whereby combustion gases generated in the production of cement clinker carry finely divided, calcium rich particles out of the kiln where they are captured in dust collectors. CKD can be removed from kiln system or be returned to the process, depending on its chemistry. These dusts are very fine, with a specific surface area of roughly 0.5 $m^2$/g, and often contain significant amounts of free lime (CaO). The composition of cement kiln dust can vary considerably, depending on the kiln type and the composition of the raw materials entering the kiln. Cement kiln dust often contain significant levels of sodium and potassium salts, as well as magnesium oxide and metal chlorides.

In an embodiment, the mineral binder comprises Portland cement and between 0 wt.-% and 50 wt.-%, more preferentially between 35 wt.-% and 50 wt.-%, of additional mineral component, the percentage being expressed in weight of mineral component compared to the total weight of the mineral binder.

In another embodiment, the mineral binder comprises Portland cement and between 50 wt.-% and 80 wt.-%, more preferentially between 60 wt.-% and 75 wt.-%, of additional mineral component, the percentage being expressed in weight of mineral component compared to the total weight of the mineral binder. In this embodiment, the additional mineral component is preferably cement kiln dust.

In another embodiment, the mineral binder comprises Portland cement only. In other words, mineral binder comprises 100% by weight of Portland cement.

Aqueous Liquid Contaminated by Pollutants

Any aqueous liquid contaminated by organic pollutant(s) can be used. Usually the aqueous liquid will also be contaminated by inorganic pollutant(s). The method of the disclosure allows for the treatment of both organic and inorganic pollutants.

In the present invention, the terms "aqueous liquid contaminated by pollutants", "contaminated aqueous liquid" and "polluted aqueous liquid" will be used interchangeably.

The method of the disclosure is particularly suited for the treatment of contaminated aqueous liquids that are heavily polluted. More specifically, the method of the disclosure enables the immobilization of several inorganic and organic pollutants, more preferentially organic pollutants, and even more preferentially PFAS. Advantageously, the contaminated aqueous liquid comprises at least 10 ng/L, even at least 15 ng/L, even at least 20 ng/L, of PFAS substances. Advantageously, the contaminated aqueous liquid comprises up to 10g/L of PFAS substances, or up to 1 g/L.

The immobilization of the pollutants here means, without being bound by any theory, that the pollutants are trapped in the inorganic matrix form by the binder when hardening and, rendered insoluble. Once immobilized, the pollutants cannot contaminate the local environment, such as soils, groundwater, and the ecosystem at large. The pollutants could be either chemically or physically bound within the inorganic matrix, which is formed as a result of the hydration of the mineral binder, due to its chemical reactions with water.

The polluted aqueous liquid is advantageously an aqueous landfill leachate, especially landfill leachate concentrate.

Landfill leachate is defined as all water that has been in contact with waste stored in a landfill. It is caught in the drainage system and undergoes special wastewater treatment. Landfill leachate concentrates preferentially represent in volume 5% to 30% of the total volume of landfill leachate, more advantageously in volume 10 to 20%, of the total volume of landfill leachate. Such concentrates are thus heavily contaminated by several pollutants, such as mineral anions, mineral cations, and organic compounds. The anions are often sulfates and halides and the cations are frequently soluble heavy metals. The organic compounds often contain particularly PFAS substances which are usually present at a concentration above 10 ng/L, or above 15 ng/L, even above 25 ng/L, for instance up to 10 g/L, or up to 1 g/L.

Alternatively, the polluted aqueous liquid can be a sludge from wastewater treatment plants.

Method Steps and Preferred Uses

First, the contaminated aqueous liquid and the mineral binder, both as described above, are mixed to produce an homogeneous slurry.

The mixing step (i) can be carried out in a batch process or continuously.

In order to implement the method of the present invention, the mineral binder of the disclosure is typically stored in a silo. The mineral binder is then added to a blender where it is mixed with the contaminated aqueous liquid with standard mixing equipment. A weigh feeder, or an equivalent method of addition, is used to adjust the amount of mineral binder to be added. The mixer can be a planetary mixer, an open mixer, or a continuous mixer.

The preferred mass ratio between the mineral binder of the disclosure and the contaminated aqueous liquid ranges from 40:60 to 60:40 and is preferably 50 wt.-% / 50% wt.-%.

In a preferred embodiment, the mix will only contain the contaminated aqueous leachate or the leachate concentrate, the Portland cement and optionally the mineral component. Accordingly, the mix preferably does not comprise fibers, such as cellulose fibers, textile fibers, glass fibers, plastic fibers, chopped straw and hay, and combinations thereof. Accordingly, the mix preferably does not comprise polymer or latex. Accordingly, the mix preferably does not comprise sand or granulates or gravels or any brick waste fractions.

Secondly, the homogeneous slurry is deposited, preferably sprayed, advantageously on the waste pile.

The person skilled in the art can adapt the total amount of water, or add additional water during the mixing, should the slurry be difficult to mix or too thick for being pumped and sprayed.

It has been advantageously noticed that the slurry does not form free water after 12 hours, more advantageously after 24 hours.

Third, the slurry is allowed to set and harden. In other words, the method comprises a step (iii) of hardening of the slurry.

The resulting material does not develop a high strength and could easily be excavated, which is a necessary feature of landfill daily covers. Advantageously, the compressive strength at 28 days of the material is less than 15 MPa, preferably less than 10 MPa, more preferably less 3 MPa, even more preferably less than 2 MPa.

The method of treatment of the present disclosure is preferentially done on site, i.e. directly where the polluted liquid is collected, especially at a landfill site. This avoids dangerous handling and transportation of the polluted liquid to facilities that are suitable for the treatment of such waste products, and also eliminates the risk of accidentally spilling the polluted waste, which would in turn contaminate groundwater or soil.

Aqueous Landfill Leachate or Leachate Concentrate Contaminated by Pollutants

The method of the disclosure is particularly suitable for treating leachates, especially leachate concentrates, in landfill operations.

In landfill operations, the waste materials need to be covered on a daily basis for the health and safety of its local environment and to reduce the disturbances related to unpleasant odors from the landfill. This covering layer is typically called a daily cover. The method of treatment of the disclosure optionally includes an additional step where, immediately after mixing the mineral binder with the contaminated aqueous liquid, the fresh resulting slurry is sprayed directly onto the landfill in a layer typically 5 to 10 cm thick. The layer can be made thicker if regulations require this. Once the mineral binder has set, this layer becomes a solid excavatable cover of the landfill, which is a suitable daily or interim cover of the landfill.

It is not an aim of the method of the present disclosure to produce a material that can be used as a hard or permanent cover of a permanently closed and capped landfill.

The mixing of the mineral binder and the polluted liquid produces a slurry that is then sprayed onto the landfill to generate the daily or interim cover of the landfill. Once hardened, the slurry becomes stiff but has a low compressive strength and is easily excavated.

Advantageously, the slurry is sprayed in a layer of comprised between 5 and 10 cm to form a daily cover of waste piles. The layer can be made thicker if regulations require this.

The disclosure is particularly directed to a method of treatment provide a method of treatment of an aqueous landfill leachate or an aqueous leachate concentrate contaminated by organic pollutants, comprising the steps of:

(i) mixing the aqueous landfill leachate or the aqueous landfill leachate concentrate with a mineral binder containing Portland cement in order to produce a homogeneous slurry, (ii) depositing, advantageously spraying, the slurry on a waste pile to form a daily or interim cover, (iii) letting the slurry set and harden for later use as a daily or interim cover on the waste pile.

The mineral binder is as described above. Landfill leachates and leachate concentrates are as described above.

Steps (i) to (iii) are preferably done on site, directly at the landfill site.

The method of the disclosure allows solidification of organics pollutants, especially PFAS, in leachate, or other sources of water, for the express purpose of reducing the likelihood of the compounds re-entering either the landfill leachate, the groundwater, or soil.

The method of the disclosure will stabilize, including change the chemistry, of heavy metals and make them insoluble, non-hazardous and non-leachable while simultaneously solidifying or encapsulating the organic molecules.

The following examples illustrate the invention.

Materials

The type of cement is defined by reference to the ASTM classification C150/C150M of 2018.

| Material type | Short description | Origin (plant) |
| --- | --- | --- |
| Type I | Portland Cement | Alpena cement plant, Michigan, US |
| Type III | High early age strength Portland Cement | Alpena cement plant, Michigan, US |
| CKD | Cement Kiln Dust | Alpena cement plant, Michigan, US |

Composition of Mineral Binders (% are expressed in Weight Compared to the Total Weight of Cement and CKD)

| Mineral binder reference | Cement type and content | CKD content |
| --- | --- | --- |
| LH Mix 1 | Type I - 50 wt.-% | 50 wt.-% |
| LH Mix 2 | Type I - 30 wt.-% | 70 wt.-% |
| LH Mix 3 | Type I - 100 wt.-% | 0 wt.-% |
| LH Mix 4 | Type III - 37.5 wt.-% | 62.5 wt.-% |

In the following examples, the leachate concentrate is treated by mixing it with the mineral binder in a planetary mixer, to produce a slurry. The mineral binder content in the slurry is 50 wt.-% with mixes LH Mix 1, LH Mix 2 and LH Mix 4. In the case of LH Mix 3, the mineral binder content in the slurry is 44.4 wt.-%. In all cases, the mineral binder content, in percentage, is expressed in weight of mineral binder compared to the total weight of the slurry.

For all the slurries prepared in these examples, the amount of free water that was generated was visually assessed. Cement slurries, if left to sit without mixing and under the effect of gravity, can segregate before the cement actually sets. This means that the heavier elements of the slurry, here the mineral components migrate, to the lower part of the slurry, and a layer of free water forms on the top of the slurry. Such a phenomenon is not suitable for forming a good quality daily cover of a landfill.

None of the slurries prepared in these examples exhibited free water after 12 hours, even after 24 hours.

Also, once hardened, the slurries did not develop a high strength and could easily be excavated, which is a necessary feature of landfill daily covers.

In all of the following examples, the extraction procedure and the testing methods used to dose the contaminants in the polluted leachate concentrate in the treated leachate are described in the SW-846 Test Method 1310B of November 2004, issued by the United States Environmental Protection Agency.

Leachate Performance of Liquids Polluted by Inorganic Elements

In the following table, the concentration of different contaminants is measured in the reference leachate concentrate, and in different samples treated by the mineral binders LH Mix 1, LH Mix 2, LH Mix 3 and LH Mix 4. The results show that all mixes are able to reduce the measured amount of pollutants. More specifically:

Chloride levels are 1-2 orders of magnitude lower with all mineral binders,

Chromium levels are 1-2 orders of magnitude lower with all mineral binders,

Copper levels are 1 order of magnitude lower with all mineral binders,

Iron levels are 1-2 orders of magnitude lower with all mineral binders,

Magnesium levels are 1-2 orders of magnitude lower with all mineral binders,

Manganese levels are 2-3 orders of magnitude lower with all mineral binders,

Nickel levels are 1 order of magnitude lower with all mineral binders,

Nitrogen/Ammonia levels are 2 orders of magnitude lower with all mineral binders, Potassium levels are 1-2 orders of magnitude lower with all mineral binders, Residue, Dissolved (TDS) 1 order of magnitude lower with all mineral binders, Selenium levels are 1-2 orders of magnitude lower with all mineral binders, Sodium levels are 1-2 orders of magnitude lower with all mineral binders, Sulfate levels were lower with all mineral binders, especially with LH Mix 3 (3 orders of magnitude), Zinc levels are 1-2 orders of magnitude lower with all mineral binders.

It was also found that LH Mix 3 outperformed all other mix designs in reducing leachable contaminant concentrations in nearly all cases. LH Mix 1 performed overall well, as well as LH Mix 2, with a few minor exceptions. LH Mix 4 mix did give some improved performance over LH Mix 2, but not significantly.

LH Mix 3 was the most efficient at reducing the leachability of all contaminants compared to the other mixes.

Cement Type Ill (LH Mix 4) was able to reduce the amount of contaminants without, but not as well as Type I cement (LH Mix 3).

|  | Unit | Reference | LH Mix 1 | LH Mix 2 | LH Mix 3 | LH Mix 4 |
| --- | --- | --- | --- | --- | --- | --- |
| Alkalinity, Total | mg/L | 2,940 | 2,700 | 2,400 | 1,800 | 2,200 |
| Aluminum | µg/L | 700 | 2,600 | 990 | 1,100 | 200 |
| Antimony | µg/L | <10 | 2.6 | 0.66 | 0.52 | 0.38 |
| Arsenic | µg/L | 432 | 4.0 | 4.2 | 1.3 | 3.7 |
| Barium | µg/L | 819 | 250 | 250 | 810 | 250 |
| Beryllium | µg/L | <5 | ND | ND | ND | ND |
| Cadmium | µg/L | <1 | 0.28 | 0.31 | ND | ND |
| Calcium | µg/L | 522,000 | 1,000,000 | 1,100,000 | 600,000 | 1,100,000 |
| Chemical Oxygen Demand | mg/L | 5,460 | 80 | 100 | 38 | 97 |
| Chloride | mg/L | 6,940 | 150 | 210 | 53 | 190 |
| Chromium | µg/L | 446 | 39 | 35 | 5 | 5.4 |
| Copper | µg/L | 22.7 | 7.3 | 3.9 | 2.3 | 1.6 |
| Iron | µg/L | 19,100 | 2,600 | 1,300 | 890 | 780 |
| Lead | µg/L | 14.3 | 40 | 39 | 13 | 22 |
| Magnesium | µg/L | 425,000 | 1,700 | 660 | 410 | 180 |
| Manganese | µg/L | 2,980 | 84 | 30 | 22 | 6.2 |
| Mercury | µg/L | <0.2 | ND | ND | ND | ND |
| Nickel | µg/L | 418 | 37 | 30 | 11 | 30 |
| Nitrogen, Ammonia | mg/L | 1,850 | 20 | 18 | 15 | 26 |
| Potassium | µg/L | 1,930,000 | 390,000 | 690,000 | 65,000 | 470,000 |
| Residue, Dissolved (TDS) | mg/L | 22,000 | 4,550 | 5,110 | 1,760 | 4,840 |
| Selenium | µg/L | 43.5 | 4.0 | 4.7 | ND | 3.6 |
| Silver | µg/L | <1 | 0.57 | 0.29 | ND | ND |
| Sodium | µg/L | 4,930,000 | 150,000 | 210,000 | 80,000 | 180,000 |
| Sulfate | mg/L | 8,530 | 1,400 | 1,700 | 3.1 | 1,500 |
| Thallium | µg/L | <1 | 1.9 | 3.4 | 0.24 | 1.7 |
| Zinc | µg/L | 541 | 48 | 20 | ND | 8.7 |

ND: Not Detected

Leachte Performance of Liquids Polluted by Organic Elements

The results shown below prove that the method of the present invention, applied with any of the mineral binders tested, is able to suppress most if not all of the organic pollutants that were initially present in the reference. Overall LH Mix 3 performed best to reduce the concentration of organic pollutants.

| Analyte | Unit | Ref | LH Mix 1 | LH Mix 4 | LH Mix 3 | LH Mix 4 |
|---|---|---|---|---|---|---|
| Perfluoroheptanoic acid (PFHpA) | ng/L | 1100 | 28.9 | 28.2 | 11.4 | 33.6 |
| Perfluorononanoic acid (PFNA) | ng/L | 110 | ND | ND | ND | ND |
| Perfluorododecanoic acid (PFDoA) | ng/L | <10 | ND | ND | ND | ND |
| Perfluorotridecanoic Acid (PFTriA) | ng/L | <10 | ND | ND | ND | ND |
| Perfluorotetradecanoic acid (PFTeA) | ng/L | <10 | ND | ND | ND | ND |
| Perfluorobutanesulfonic acid (PFBS) | ng/L | 1100 | 29.2 | 37.1 | 14.1 | 34.4 |
| Perfluorohexanoic acid (PFHxA) | ng/L | 6000 | 107 | 137 | 49.6 | 127 |
| Perfluorooctanoic acid (PFOA) | ng/L | 1800 | 28.4 | 35.3 | 12.1 | 31.8 |
| Perfluorodecanoic acid (PFDA) | ng/L | <500 | ND | ND | ND | ND |
| Perfluoroundecanoic acid (PFUnA) | ng/L | <500 | ND | ND | ND | ND |
| Perfluorohexanesulfonic acid (PFHxS) | ng/L | 1800 | 31.7 | 40.5 | 14.5 | 35.8 |
| Perfluorooctanesulfonic acid (PFOS) | ng/L | <500 | 2.22 | 2.6 | ND | 2.6 |
| N-methyl perfluorooctane sulfonamidoacetic acid (NMeFOSAA) | ng/L | <5000 | ND | ND | ND | ND |
| N-ethyl perfluorooctane sulfonamidoacetic acid (NEtFOSAA) | ng/L | <5000 | ND | ND | ND | ND |

ND: Not Detected

The invention claimed is:

1. A method for treating an aqueous landfill leachate or an aqueous leachate concentrate contaminated by organic pollutants, comprising the steps of:
   (i) mixing the aqueous landfill leachate or the aqueous leachate concentrate with a mineral binder in order to produce a slurry consisting of the aqueous landfill leachate or the aqueous leachate concentrate, the mineral binder, and, optionally, water, the mineral binder consisting of Portland Cement and a mineral component, the mineral component selected from cement kiln dust, lime dust, ground limestone, ground slag, fly ash, burnt oil shale, or a mixture thereof;
   (ii) depositing the slurry on a waste pile; and
   (iii) letting the slurry set and harden.

2. The method according to claim 1, wherein in step (ii) the slurry is sprayed.

3. The method according to claim 1, wherein steps (i) to (iii) are done at a landfill site.

4. The method according to claim 1, wherein the mixing step (i) is carried out in a batch process or continuously.

5. The method according to claim 1, wherein the organic pollutants comprise per-and polyfluoroalkyl substances.

6. The method according to claim 1, wherein the aqueous leachate concentrate comprises between 5% and 30%, inclusive, by volume of a total volume of aqueous landfill leachate.

7. The method according to claim 6, wherein the concentrate comprises between 10% and 20%, inclusive, by volume of the total volume of aqueous landfill leachate.

8. The method according to claim 1, wherein the aqueous leachate concentrate is a sludge from wastewater treatment plants.

9. The method according to claim 1, further comprising excavating the hardened slurry from the waste pile.

10. The method according to claim 1, wherein the landfill leachate concentrate comprises at least 10 ng/L of per- and polyfluoroalkyl substances.

11. The method according to claim 1, wherein the mineral component comprises cement kiln dust.

12. The method according to claim 1, wherein a material resulting from the set and hardened slurry has a compressive strength at 28 days of less than 15 MPa.

13. The method according to claim 1, wherein setting and hardening the slurry comprises trapping the organic pollutants within the mineral binder.

14. The method according to claim 1, wherein the mineral component comprises from 35 wt% to 80 wt%, inclusive, of the mineral binder.

* * * * *